Jan. 30, 1945.  T. A. P. T. KOHT  2,368,584
BULL GEAR LOCK
Filed Aug. 14, 1943
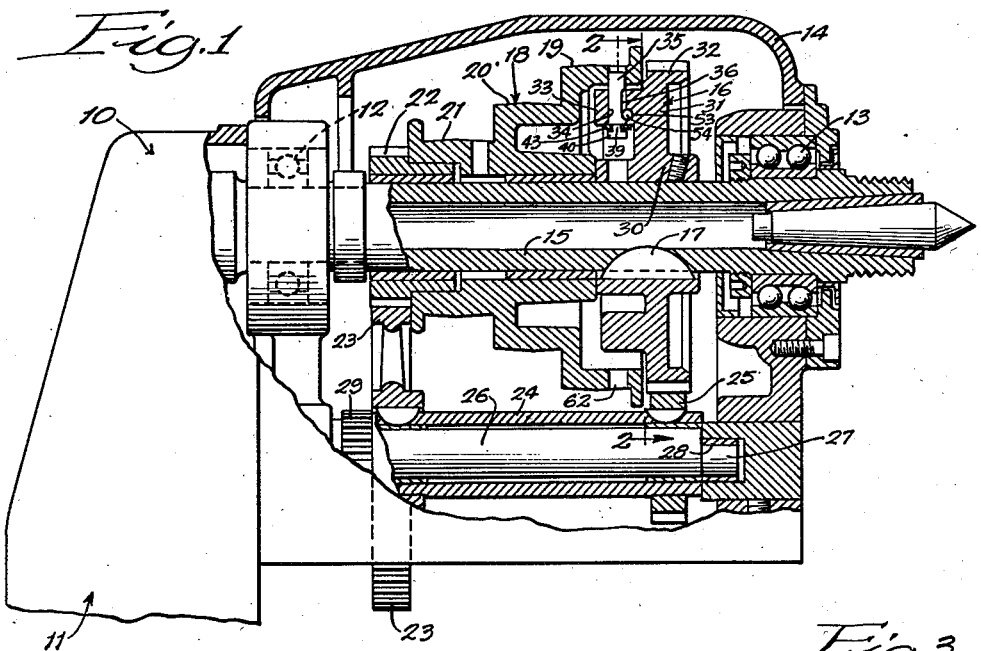
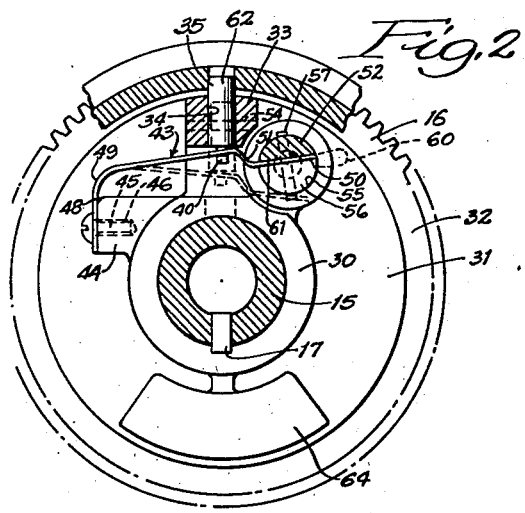
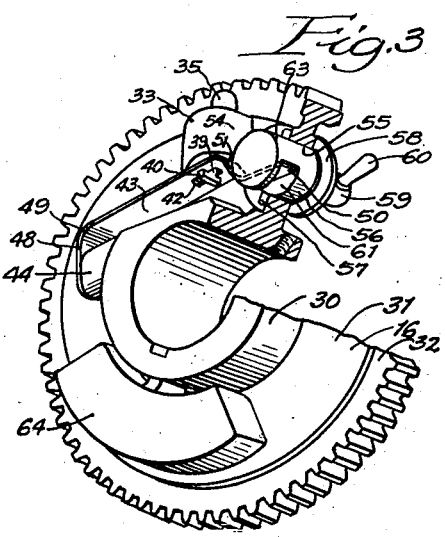
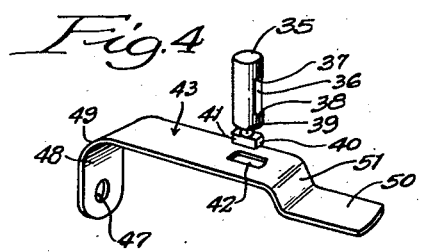
Inventor:
Thorvald A. P. Thronsen Koht,
By McCaleb, Nead & Dickinson
Attorneys.

Patented Jan. 30, 1945

2,368,584

UNITED STATES PATENT OFFICE 2,368,584

BULL GEAR LOCK

Thorvald A. P. Thronsen Koht, Chicago, Ill., assignor to Logan Engineering Co., Chicago, Ill., a corporation of Illinois Application August 14, 1943, Serial No. 498,708

5 Claims. (Cl. 192—39)

The present invention relates to bull gear locks, and is particularly concerned with devices for locking or securing the driving pulley of a lathe to the bull gear which is carried by the spindle of the lathe, in such manner that the spindle can be driven directly from pulley to bull gear to spindle when desired, instead of being driven through the back gears of the lathe at the reduced speed provided by the back gears.

One of the devices of the prior art over which the present invention is an improvement, permits the securement of the bull gear of the lathe to the pulley; but the prior art devices are cumberson in operation and slow to operate, involving the turning of the pulley by hand until the bull gear and pulley reach a certain position of registration of the securing device. The devices of the prior art required particular attention in their manipulation, and more time for manipulation, thereby taking time and attention of the operator which might better be devoted to other operations.

One of the objects of the invention is the provision of an improved and more simple form of bull gear locking device, which may be manipulated by the lathe operator with greater ease and without the necessity for the particular attention and waste of time involved in the operation of the devices of the prior art.

Another object of the invention is the provision of a locking device for the pulley and the bull gear of a lathe, of the class described, which is sturdy, capable of economical manufacture and sale, and adapted to perform its functions for a long period of time without necessity for repair or replacement.

Another object of the invention is the provision of an improved bull gear lock of the class described, which is so arranged that it is only necessary to actuate a single lever, after which the securement of the pulley and bull gear together takes place automatically by virtue of spring action of the device.

Another object of the invention is the provision of a device of the class described which is so constructed that its operation is guarded against centrifugal force acting upon the parts of the device, and which is simple to operate and to release.

Other objects and advantages of the invention will be apparent from the following description and the accompanying drawing, in which similar characters of reference indicate similar parts throughout the several views.

Referring to the single sheet of drawings accompanying this specification,

Fig. 1 is a side elevational view in partial section of a fragment of a lathe at the spindle end, embodying the invention;

Fig. 2 is a fragmentary vertical sectional view, taken on the plane of the line 2—2 of Fig. 1, looking in the direction of the arrows;

Fig. 3 is a view in perspective, partially broken away, of the bull gear and the actuating mechanism for the invention; and Fig. 4 is a view in perspective of the mechanism of the device, showing the spring and plunger in the course of their being assembled as further described herein.

Referring to the drawing, Fig. 1, 10 indicates in its entirety a lathe equipped with a device embodying the invention. The lathe 10 is provided with the usual supporting frame member 11 for the spindle end of the lathe 10, and with the bearings 12, 13, carried by the housing 14, for the spindle 15.

The lathe spindle 15 carries the bull gear 16, which is secured on the spindle 15 to rotate the spindle 15 by means of a key and key way 17. A pulley 18, preferably of the type having a plurality of pulley portions 19, 20, 21, of different diameters, is rotatably mounted upon the spindle 15 for free rotation with respect to the spindle, but is secured to the pinion 22 to rotate pinion 22.

Pinion 22 is adapted to mesh with and drive the spur gear 23, carried by the tubular shaft 24, which also carries the pinion 25 adapted to mesh with and drive the bull gear 16. The tubular shaft 24 is movable by means of the eccentric portion 26 of a shaft 27 mounted in bearings 28. By means of a rack (not shown) operating on the gear 29, the eccentric shaft 27 may be turned and the eccentric portion 26 will bring the gears 22, 23, and 16, 25, into mesh with each other, respectively, or it will move these gears out of mesh with each other; and the gear train 22, 23, 25 is usually referred to as the "back gears" of the lathe.

The back gears drive the spindle at a reduced rate of speed as compared with the drive pulley speed (18), and it is desirable to provide the lathe with means for driving the bull gear and spindle directly with the pulley 18 and at the same speed as the pulley 18.

For this purpose the bull gear 16 is preferably provided with a hub 30, a wheel flange 31, and tooth supporting rim 32, and the wheel flange 31 may support a plunger guide 33, comprising a body having a radially extending bore 34. The bore 34 slidably supports a plunger 35, comprising a substantially cylindrical member, one side of which is flattened over a portion of its length at 36, and provided with shoulders 37, 38 between the flattened portion and the cylindrical portions thereof.

The lower end (Fig. 4) of the plunger 35 is preferably provided with a portion of substantially T-shaped formation, comprising the part 39 of reduced cylindrical shape and the head 40, which is elongated and provided with the plane side surfaces parallel to each other. The head 40 is adapted to be received in the complementary aperture 42, in the spring 43; and when the plunger is turned to a position at right angles to that of Fig. 4, with respect to the aperture 42, the plunger will be connected to the spring so that it will move with the spring.

The hub 30 is also provided with a projection 44 having a bore for receiving the pin 46 and indicated by the numeral 45. The pin 46 passes through the hole 47 in the attaching flange portion 48 of the spring 43, and may be secured in bore 45 by a frictional fit to secure spring 43 to the hub 30 of bull gear 16. The spring 43 is preferably bent at 49 to extend transversely to the plunger 35, and the spring has an actuating portion 50 extending beyond the plunger 35 below the cam 52. The spring 43 is offset at 51 to bring its actuating portion 50 into the proper plane below the cam 52, and the spring 43 resiliently urges the plunger 35 upward in Fig. 2 and presses against the cam 52, which is adapted to withdraw the plunger 35 by acting on the spring 43.

In order to limit the motion of the plunger 35, the guide body 33 is provided with a transverse bore 53 intersecting the bore 34, which contains the plunger 35 at such point that a pin 54 in bore 53 engages the flat side 36 of plunger 35 and serves to prevent the rotation of the plunger 35. This pin 54 has a tight frictional fit in its bore 53, and it also serves to stop the sliding motion of the plunger 35 when the shoulders 37, 38 engage the pin 54.

The pin 54 thus serves to limit the sliding movement of the plunger 35 and to prevent its disengagement from the spring 43.

The wheel flange 31 of the bull gear 16 is preferably provided with a through bore 55 for receiving the hub portion 56 of the cam 52 which is held in said bore by a transverse pin 57 carried by hub portion 56 and engaging the wheel flange 31. The cam member 52 has a thrust flange 58 and an integral ball-shaped shaft extension 59 provided with a radial actuating arm 60. The parts 59 and 60 are smoothly finished and rounded so that they may be grasped by the fingers of the operator without looking and without injury to the fingers.

At its opposite end the cam member 52 is provided with a slot 61 of sufficient width to receive the actuating portion 50 of the spring 43, and the slot has a depth which corresponds substantially to the movement desired for the plunger 35. When the spring 43 is in the slot 61, the spring 43 is permitted to move upward in Fig. 2 to such a point that the plunger 35 protrudes from its guide bore 34 and extends into engagement with the inside of the wheel flange 19, or projects into one of several bores 62 in the wheel flange 19. When the handle 60 is rotated through an arc of 180 degrees, the cylindrical portion 63 of cam member 52 engages spring 43 and forces the spring downward in Fig. 2, to withdraw the plunger 35 from bore 62 in the pulley portion 19 of pulley 18.

Then the bull gear is disconnected from the pulley 18, but when the cam member is in the position of Fig. 2, the bull gear and pulley 18 are connected to rotate together. Whenever it is desired to connect the bull gear to the pulley, it is not necessary to turn either of these parts until the position of registration of the plunger and a bore 62 is found; it is only necessary to turn the cam member 52 by means of handle 60. Then the spring pressure will be placed on the plunger 35, and it will ride on the inside of the wheel or pulley flange 19 until it automatically snaps into a bore 62 and connects the bull gear and pulley.

The operation of my invention will be apparent from the foregoing description. The assembly of the parts will also be apparent, except that it should be noted that the plunger has its head 41 first inserted into the slot 42, and then turned ninety degrees. Then the plunger may be inserted in the bore 34, and when the pin 54 is driven into place, its engagement with the flat side 36 of the plunger prevents the plunger from rotating, and keeps the head 41 extending transversely to the elongated aperture 42 so that the head cannot get out of the aperture.

The back gears should, of course, always be withdrawn before connecting the bull gear and the pulley.

It will thus be observed that I have invented an improved device for locking the bull gear and pulley together, which is simple, and which is adapted to place spring pressure on the plunger so that the plunger automatically snaps into locking position. The present locking device can be operated in a fraction of the time required for the devices of the prior art. The bull gear may be counterbalanced at 64 to compensate for the additional weight of the locking device, which is located diametrically opposite to the counterbalance.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a device for locking the bull gear of a lathe to the driving pulley, the combination of a bull gear carried by the spindle of a lathe, with a driving pulley mounted on said spindle for free rotation, said pulley having a radially extending aperture in its pulley flange, guide means carried by said bull gear, for slidably supporting a locking plunger, a plunger in said guide means, and manually controllable spring means for urging said plunger in a direction to engage in said aperture, whereby the plunger may ride on the inside of the pulley until plunger and aperture are in registry and then the plunger is snapped into the aperture to lock the bull gear and pulley together for simultaneous rotation, said plunger having a substantially T-shaped head, said spring means being provided with a complementary aperture for receiving said head, said plunger being rotated in said aperture to cause the spring means to become attached to said plunger.

2. In a device for locking the bull gear of a lathe to the driving pulley, the combination of a bull gear carried by the spindle of a lathe, with a driving pulley mounted on said spindle for free rotation, said pulley having a radially extending aperture in its pulley flange, guide means carried by said bull gear, for slidably supporting a locking plunger, a plunger in said guide means, and manually controllable spring means for urging said plunger in a direction to engage in said aperture, whereby the plunger may ride on the inside of the pulley until plunger and aperture are in registry and then the plunger is snapped into the aperture to lock the bull gear and pulley together for simultaneous rotation, said manual means comprising a rotatable cam for engaging said spring and for retracting said spring and plunger, said plunger being of substantially cylindrical shape and provided with a flat side portion, said bull gear being provided with a pin extending transversely to said plunger and engaging the flat side of said plunger to prevent rotation of said plunger.

3. In a device for locking the bull gear of a lathe to the driving pulley, the combination of a bull gear carried by the spindle of a lathe, with a driving pulley mounted on said spindle for free rotation, said pulley having a radially extending aperture in its pulley flange, guide means carried by said bull gear, for slidably supporting a locking plunger, a plunger in said guide means, and manually controllable spring means for urging said plunger in a direction to engage in said aperture, whereby the plunger may ride on the inside of the pulley until plunger and aperture are in registry and then the plunger is snapped into the aperture to lock the bull gear and pulley together for simultaneous rotation, said manual means comprising a rotatable cam for engaging said spring and for retracting said spring and plunger, said plunger being of substantially cylindrical shape and provided with a flat side portion, said bull gear being provided with a pin extending transversely to said plunger and engaging the flat side of said plunger to prevent rotation of said plunger, said plunger also having shoulders at each end of said flat side portion and said pin engaging said latter shoulders to limit the sliding movement of said plunger.

4. In a lathe drive, the combination of a supporting frame with a lathe spindle having a bull gear mounted on said spindle for rotation with said spindle, a pulley mounted on said spindle for free rotation with respect to said spindle, said pulley having an axially extending pulley flange provided with a radial aperture, an axially projecting body carried by said bull gear adjacent said pulley and inside said pulley flange, said body having a radially extending bore, a plunger slidably mounted in said bore for engagement in said aperture in said pulley flange, and manual means for controlling the movement of said plunger to lock said bull gear to said pulley for rotation with said pulley or to release said bull gear from said pulley, said plunger having a flat side portion and stop shoulders at the ends of said flat portion, and a pin extending transversely to said plunger, said pin preventing rotation of said plunger and limiting the sliding movement of said plunger.

5. In a device for locking the bull gear of a lathe to the driving pulley, the combination of a shaft provided with a bull gear keyed to said shaft, a multiple pulley member rotatably mounted on said shaft and having an open end at its largest pulley adjacent said bull gear, said bull gear having a laterally projecting lug extending inside the open end of said multiple pulley member, a plunger slidably mounted in a radially extending bore in said lug, said plunger being adapted to register with an aperture in the periphery of the largest pulley of said multiple pulley member, spring means for urging said plunger into said latter aperture, stop means for limiting the movement of said plunger, and manual means for blocking the action of said spring means and maintaining said plunger out of engagement with said pulley member at will.

THORVALD A. P. THRONSEN KOHT.